United States Patent [19]

Fujiwara

[11] Patent Number: 4,623,832
[45] Date of Patent: Nov. 18, 1986

[54] SECONDARY BATTERY QUICK-CHARGING CIRCUIT

[75] Inventor: Toshiaki Fujiwara, Hiroshima, Japan

[73] Assignee: Ryobi Ltd., Fuchu, Japan

[21] Appl. No.: 548,728

[22] Filed: Nov. 4, 1983

[30] Foreign Application Priority Data

Nov. 12, 1982 [JP] Japan .................. 57-171727[U]

[51] Int. Cl.[4] .............................................. H02J 7/00
[52] U.S. Cl. ...................................... 330/23; 320/36; 320/48
[58] Field of Search ................. 320/22, 23, 35, 36, 320/48

[56] References Cited

U.S. PATENT DOCUMENTS 4,031,450  6/1977  Hammel et al. .................. 320/23
4,240,022 12/1980  Kilinskis et al. .................. 320/23

Primary Examiner—Patrick R. Salce
Assistant Examiner—Anita M. Ault
Attorney, Agent, or Firm—Finnegan, Henderson, Farabow, Garrett & Dunner

[57] ABSTRACT

A battery charging circuit includes a thermostat for sensing the temperature of the battery as it is charged, a silicon controlled rectifier which when conductive enables charging of the battery and when non-conductive prevents charging of the battery, and a transistor for preventing the silicon controlled rectifier from returning to the conductive state after being switched to the non-conductive state. When the temperature of the battery reaches a predetermined level corresponding to complete charging, the thermostat switches the silicon controlled rectifier to the non-conductive state and enables the transistor to be turned on to prevent further charging of the battery after the temperature thereof falls below the preselected level.

8 Claims, 1 Drawing Figure

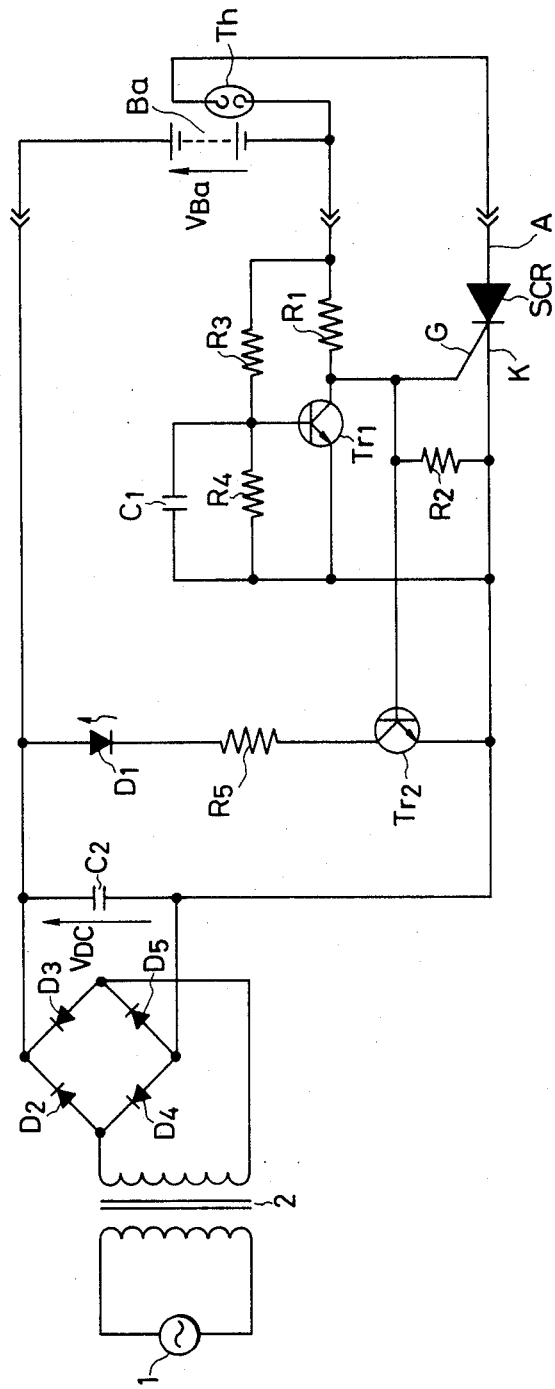

SECONDARY BATTERY QUICK-CHARGING CIRCUIT

FIELD OF THE INVENTION

This invention relates to a circuit for charging a battery. More specifically, the invention relates to a secondary battery quick-charging circuit with a thermostat for overcharge prevention.

BACKGROUND OF THE INVENTION

A secondary battery quick-charging circuit is disclosed in Japanese Utility Model Application No. 134231/1979. According to this application, a silicon controlled rectifier is controlled by the charging current of a capacitor. This arrangement is disadvantageous because in the event the supply voltage varies after the battery has been fully charged and during a period when overcharge is being prevented, a charging current flows in the capacitor and the silicon controlled rectifier is erroneously operated.

Japanese Utility Model Application No. 36745/1982 discloses a secondary battery quick-charging circuit wherein after the battery has been fully charged, a small current continues to flow in a transistor. The disadvantage of this arrangement is the resultant loss of electric power irrespective of the battery charging operation.

OBJECTS AND SUMMARY OF THE INVENTION

It is an object of the present invention to accurately control the operation of a silicon controlled rectifier in a battery charging circuit.

Another object of the present invention is to eliminate the loss of the electric power in a battery charging circuit during periods when the battery is fully charged.

Still another object of the present invention is to prevent the operation of a silicon controlled rectifier in a battery charging circuit at a time when the battery is fully charged.

These and other objects are accomplished by a battery charging circuit adapted to be connected to a source of battery-charging voltage having a first terminal connected to a first terminal of the battery, and a second terminal, the battery charging circuit comprising first control means for controlling the charging of the battery. The first control means includes a first operation mode for enabling the charging of the battery by the battery-charging voltage source and a second operation mode for preventing the charging of the battery. A second control means is connected to the first control means for selectively preventing the first control means from switching from the second operation mode to the first operation mode. Means are provided responsive to a predetermined temperature of the battery for switching the first control means to the second operation mode and for controlling the second control means to prevent the first control means from thereafter switching from the second operation mode to the first operation mode.

BRIEF DESCRIPTION OF THE DRAWING

These and other objects, features, and advantages of the invention, as well as the invention itself, will become more apparent to those skilled in the act in the light of the following detailed description taken in consideration with the accompanying drawing wherein;

The drawing FIGURE is a circuit diagram of a preferred embodiment of the present invention.

DETAILED DESCRIPTION OF THE PREFERRED EMBODIMENT

As embodied herein, a source of battery-charging voltage comprises an AC source 1, a transformer 2, and a diode bridge comprising the diodes D2, D3, D4, and D5. The rectified output of the diode bridge is the voltage level $V_{DC}$ which is smoothed by a capacitor C2.

A battery Ba, having a voltage drop of $V_{Ba}$, is connected in series with the capacitor C2, with a first control means for controlling the charging of the battery Ba, and with means responsive to a predetermined charge state of the battery Ba for switching the first control means from a first operation mode to a second operation mode.

As embodied herein, the switching means comprises a thermostat Th for sensing the temperature of the battery Ba. In the preferred embodiment, the first control means comprises a silicon controlled rectifier SCR having a gate G, an anode A connected to one output of the thermostat Th, and a cathode K. A first operation mode of the silicon controlled rectifier SCR comprises a conductive state which enables charging of the battery Ba and a second operation mode of the silicon controlled rectifier SCR comprises a non-conductive state which disables charging of the battery Ba.

A second control means is connected in series to the thermostat Th and the battery Ba and is provided for selectively preventing the silicon controlled rectifier SCR from switching back to the conductive state after the thermostat Th has controlled the silicon controlled rectifier SCR to switch to the non-conductive state from the conductive state responsive to a preselected temperature of the battery Ba. The preselected temperature corresponds to a fully charged state of the battery Ba.

As embodied herein, the second control means comprises a control circuit for controlling the gate voltage of the silicon controlled rectifier SCR. The control circuit comprises the resistors, R1, R3, R4, the capacitor C1, and the transistor Tr1.

A bias resistor R2 is connected between the gate G and the cathode K of the silicon controlled rectifier SCR. The base of a transistor Tr2 is connected to the gate G of the silicon controlled rectifier SCR. A charge display element D1 and a current limiting resistor R5 are connected through the transistor Tr2 in parallel to the capacitor C2.

The above-described circuit in the single FIGURE operates as follows. Immediately after charging begins, the capacitor C1 is not yet charged, the base-emitter voltage of the transistor Tr1 is zero, and the transistor Tr1 is non-conductive. Accordingly, as the capacitor C1 is charged, a gate current flows to the gate of the silicon controlled rectifier SCR. The value of the resistor R1 is so determined that, before charging, the capacitor C1 advances to render the transistor Tr1 conductive.

The gate current of the silicon controlled rectifier SCR becomes the turn-on current to render the silicon controlled rectifier SCR conductive. Therefore, before the transistor Tr1 becomes conductive, the silicon controlled rectifier SCR is rendered conductive, so that the battery Ba may be charged.

The voltage drop across the silicon controlled rectifier SCR, which is caused by the charging current, is small and the charge voltage of the capacitor C1 does not reach a level sufficient to render the transistor Tr1 conductive, so that the charging is advanced. When the battery Ba is fully charged and the temperature of the container of the battery Ba reaches a certain, preselected level, the thermostat Th, which is thermally coupled to the battery container, is opened. As a result, the silicon controlled rectifier SCR is rendered non-conductive and charging of the battery Ba is suspended.

When the thermostat Th is opened, the difference ($V_{DC} - V_{Ba}$) between the rectified voltage $V_{DC}$ and the battery voltage $V_{Ba}$ is applied to the gate control circuit (R1, Tr1, R3, R4 and C1). As a result, the capacitor C1 is charged to the conduction voltage of the transistor Tr1, and the transistor Tr1 is rendered conductive.

Even when the battery temperature decreases and the thermostat Th is closed again, no gate current is applied to the silicon controlled rectifier SCR and the battery is not charged, because the transistor Tr1 is conductive. A voltage developed across the resistor R4 by the voltage dividing resistors R3 and R4 is so designed as to be much higher than the switching voltage of the transistor Tr1. Accordingly, even if the supply voltage varies more or less during the overcharge preventing period, the base-emitter voltage of the transistor Tr1 is high enough to maintain the transistor Tr1 conductive. Therefore, the erroneous operation of the silicon controlled rectifier SCR is positiviely prevented.

In this operation, a small current flowing through the transistor Tr1 and the resistor R1 is effective in maintaining the battery fully charged; that is, a so-called "trickle charging operation" is carried out.

While the salient features of the invention have been described with reference to the drawing, it should be understood that the embodiment is susceptible of modification without departing from the spirit and scope of the following claims.

What is claimed is:

1. A battery charging circuit capable of fast charging and trickle charging, and adapted to be connected to a source of battery-charging voltage having a first terminal connected to a first terminal of a battery and a second terminal, the battery charging circuit comprising:

first control means having a silicon controlled rectifier with an anode connected to a second terminal of the battery, a cathode connected to the second terminal of the source of battery-charging voltage, said first control means having a first operation mode, corresponding to a conductive state for said silicon controlled rectifier, for enabling the fast charging of the battery by the voltage source and a second operation mode, corresponding to a non-conductive state for said silicon controlled rectifier, for preventing the fast charging of the battery;

second control means including a transistor connected to a gate of said silicon-controlled rectifier, to the battery and to the voltage source, for selectively preventing said silicon controlled rectifier from switching from said non-conductive state to said conductive state, and for trickle charging the battery when said silicon controlled rectifier of said first control means is in said non-conductive state; and switching means, including a thermostat for sensing the battery temperature, coupled to the battery, to said transistor, and to said gate of said silicon controlled rectifier, said switching means being responsive to a pre-selected temperature of the battery corresponding to a fully charged state for switching said silicon controlled rectifier to said non-conductive state and for rendering said transistor of said second control means conductive in response to said thermostat sensing the temperature of the battery to be said pre-selected temperature and to maintain said transistor of said second control means conductive in response to said thermostat sensing the temperature of the battery to be below said pre-selected temperature to prevent said silicon controlled rectifier from thereafter switching from said non-conductive state to said conductive state.

2. A battery charging circuit according to claim 1 further including a display circuit connected in parallel to the battery, said thermostat, and said silicon controlled rectifier for indicating the charge state of the battery.

3. A battery charging circuit according to claim 2 wherein said display circuit comprises:
   a display element; and
   a second transistor having a base connected to the gate of said silicon controlled rectifier whereby said display element is illuminated during the charging of the battery.

4. A battery charging circuit according to claim 1 wherein said second control means include first, second and third series circuits connected in parallel to each other.

5. A battery charging circuit according to claim 4 wherein said first series circuit comprises a capacitor, said second series circuit comprises a transistor and a first resistor, and said third series circuit comprises a second resistor and a third resistor.

6. A battery charging circuit according to claim 5 wherein said second second series circuit is coupled to the voltage source and to the battery for trickle charging the battery.

7. A battery charging circuit comprising:
   a first series circuit including a battery which increases in temperature during the charging thereof;
   a thermostat which opens in response to the battery reaching a preselected temperature corresponding to a full charge of the battery, a first node connecting the battery and the thermostat, a first resistor connected to said first node, and a silicon controlled rectifier having a gate connected to said first resistor, a cathode and an anode;
   a first transistor having a collector connected to the gate of said silicon controlled rectifier and an emitter connected to the cathode of said silicon controlled rectifier, said first transistor and said first resistor forming a second series circuit;
   a second resistor connected in parallel to said first transistor;
   a third series circuit connected in parallel to said second series circuit, and comprising a series connection of a third resistor and a fourth resistor;
   a capacitor connected in parallel to said fourth resistor; and
   a second node connected to said third and fourth resistors and to the base of said first transistor, said thermostat rendering said silicon controlled rectifier nonconductive and said first transistor conductive responsive to said preselected temperature of the battery to prevent further charging of the battery regardless of the subsequent temperature thereof.

8. A battery charging circuit according to claim 7 further including a fourth series circuit comprising a display element, a fifth resistor, and a second transistor, said fourth series circuit being connected in parallel to said first series circuit, the second transistor having a base connected to the gate of said silicon controlled rectifier, said display element for indicating the charging of the battery.

* * * * *